(12) United States Patent
Lee et al.

(10) Patent No.: US 9,245,463 B2
(45) Date of Patent: Jan. 26, 2016

(54) DISPLAY APPARATUS AND METHOD OF MANUFACTURING THE SAME

(75) Inventors: Hee-Keun Lee, Suwon-si (KR); Haeju Yun, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 465 days.

(21) Appl. No.: 13/590,552

(22) Filed: Aug. 21, 2012

(65) Prior Publication Data

US 2013/0177732 A1 Jul. 11, 2013

(30) Foreign Application Priority Data

Jan. 6, 2012 (KR) ........................ 10-2012-0002062

(51) Int. Cl.
*G02F 1/1339* (2006.01)
*G09F 9/30* (2006.01)

(52) U.S. Cl.
CPC .............. *G09F 9/301* (2013.01); *Y10T 156/10* (2015.01); *Y10T 428/239* (2015.01)

(58) Field of Classification Search
USPC ........................................................ 349/159
See application file for complete search history.

(56) References Cited

U.S. PATENT DOCUMENTS 7,826,025 B2 11/2010 Chen et al.
8,169,588 B2 * 5/2012 Oikawa et al. ................ 349/159
2008/0213474 A1 * 9/2008 Saida et al. .................... 427/162
2010/0231840 A1 * 9/2010 Saida et al. .................... 349/153
2011/0139747 A1 6/2011 Lee

FOREIGN PATENT DOCUMENTS

| JP | 3635280 B1 * | 4/2005 |
| JP | 2010092596 A | 4/2010 |
| JP | 2011116950 A | 6/2011 |
| KR | 1019960024483 A | 7/1996 |
| KR | 1020100051389 A | 5/2010 |
| KR | 1020110011422 A | 2/2011 |
| KR | 1020110025375 A | 3/2011 |
| KR | 101040929 B1 | 6/2011 |

* cited by examiner

*Primary Examiner* — Richard Kim
*Assistant Examiner* — Ryan Crockett
(74) *Attorney, Agent, or Firm* — Cantor Colburn LLP

(57) ABSTRACT

A display apparatus includes a first substrate, a second substrate, a pixel layer and an adhesive part. The first substrate includes an adhesive area, fiber bundles and a base material which is impregnated between the fiber bundles. The second substrate includes an adhesive area, fiber bundles and a base material which is impregnated between the fiber bundles. The pixel layer is between the first and second substrates and includes a display area. The adhesive part is between the first substrate and the second substrate, is in each of the adhesive areas of the first and second substrates, and seals the pixel layer between the first and second substrates. The adhesive area of the first or second substrate includes an exposure area through which the fiber bundles are exposed, and the adhesive part contacts the exposure area.

15 Claims, 18 Drawing Sheets

DISPLAY APPARATUS AND METHOD OF MANUFACTURING THE SAME

This application claims priority to Korean Patent Application No. 10-2012-0002062 filed on Jan. 6, 2012, and all the benefits accruing from 35 U.S.C. §119, the contents of which are herein incorporated by reference in its entirety.

BACKGROUND OF THE INVENTION

1. Field of the Invention

The invention relates to a display apparatus and a method of manufacturing the same. More particularly, the invention relates to a flexible display apparatus and a method of manufacturing the flexible display apparatus.

2. Description of the Related Art

With the development of an information society, demand for various display apparatuses increases. Particularly, flat panel displays, such as a liquid crystal display ("LCD"), an organic light emitting display ("OLED"), an electrophoretic display ("EPD"), etc., have been heavily researched.

In addition, it is desired that the flat panel display has properties such as a light weight, a thin thickness, various shapes, a curved-surface display, etc. Accordingly, a flat panel display employing a flexible plastic substrate with light weight and high impact-resistance has been developed.

BRIEF SUMMARY OF THE INVENTION

One or more exemplary embodiments of the invention provide a display apparatus capable of reducing or preventing separation of flexible substrates from each other.

One or more exemplary embodiments of the invention provide a method of manufacturing the display apparatus.

According to one or more of the exemplary embodiments, a display apparatus includes a first substrate, a second substrate, a pixel layer and an adhesive part. The first substrate includes an adhesive area, fiber bundles and a base material which is impregnated between the fiber bundles. The second substrate includes an adhesive area, fiber bundles and a base material which is impregnated between the fiber bundles. The pixel layer is disposed between the first substrate and the second substrate and includes a display area. The adhesive part is disposed between the first and second substrates and is in each of the adhesive areas of the first and second substrates to seal the pixel layer between the first and second substrates. The adhesive area of the first substrate or the second substrate includes an exposure area through which the fiber bundles are exposed, and the adhesive part contacts the exposure area.

The fiber bundles include glass fibers.

According to one or more of the exemplary embodiments, a display apparatus includes a first substrate, a second substrate, a pixel layer and an adhesive part. The second substrate faces the first substrate, and the pixel layer is between the first and second substrates. The adhesive part is between the first and second substrates, adheres the first substrate to the second substrate and seals the pixel layer between the first and second substrates. One of the first substrate and the second substrate includes a recess to which the adhesive part is adhered.

According to one or more of the exemplary embodiments, a method of manufacturing a display apparatus is provided as follows. A first substrate including a plurality of pixels is prepared, and a second substrate is prepared to face the first substrate. Then, the first substrate is coupled with the second substrate. One of the first substrate or the second substrate is formed by preparing a preliminary substrate including fiber bundles, and a base material which is impregnated between the fiber bundles, and forming a recess in an adhesive area of the preliminary substrate to expose the fiber bundles.

The coupling of the first and second substrates includes filling a sealant in the recess, and pressing the first substrate and the second substrate to each other. The recess may be formed by using a laser.

According to one or more exemplary embodiments discussed above, the adhesive part which is used to couple the first substrate with the second substrate has improved adhesive force. Thus, separation of the first and second substrates from each other is reduced or effectively prevented.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
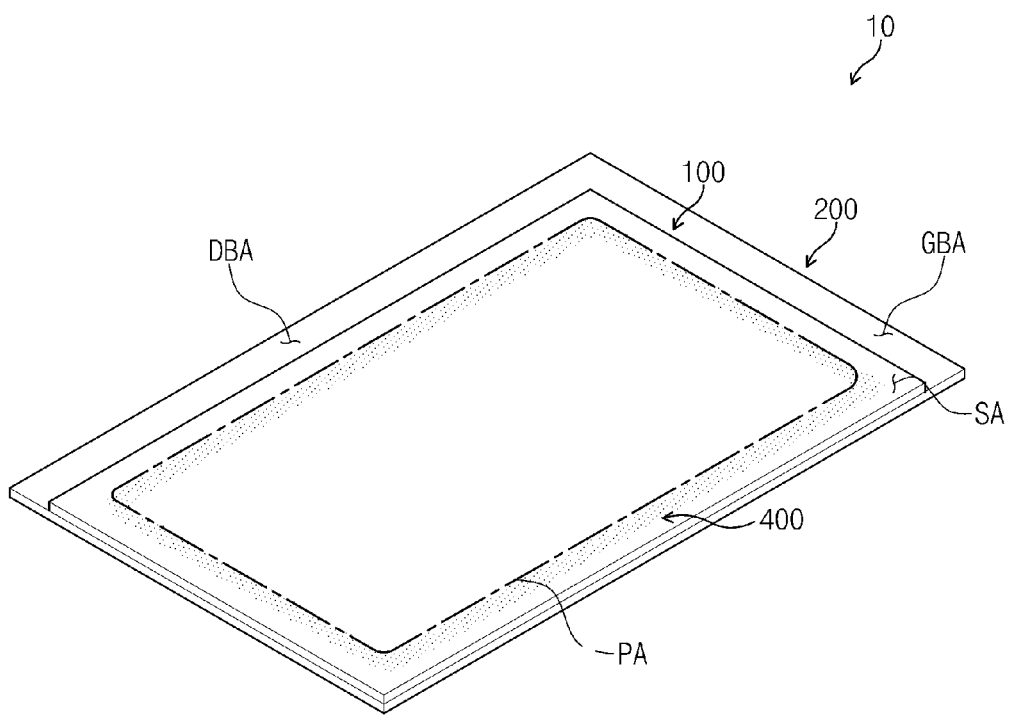
FIG. 1 is a perspective view showing an exemplary embodiment of a display apparatus according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

In the exemplary embodiments of the invention, a liquid crystal display will be described as a representative display apparatus, but the display apparatus should not be limited to the liquid crystal display. That is, the display apparatus according to the exemplary embodiments of the invention may be various display apparatuses, such as an organic light emitting display ("OLED"), an electrophoretic display ("EPD"), an electro-wetting display ("EWD"), etc.

FIG. 1 is a perspective view showing an exemplary embodiment of a display apparatus 10 according to the invention.

Referring to FIG. 1, the display apparatus 10 may be the liquid crystal display. The display apparatus 10 includes a first substrate 100, a second substrate 200, a pixel layer (not shown), and an adhesive part 400. The pixel layer (not shown) has been shown in FIG. 3 and assigned with a reference number "300."

The first substrate 100 faces the second substrate 200. The pixel layer (not shown) is disposed between the first substrate 100 and the second substrate 200. The first substrate 100 and the second substrate 200 are combined with each other by the adhesive part 400, and the adhesive part 400 seals the pixel layer between the first substrate 100 and the second substrate 200.

Different from the above, when the display apparatus 10 is the organic light emitting display, the pixel layer may include an organic light emitting layer. In the case that the display apparatus 10 is the electrophoretic display, the pixel layer may include an electrophoretic layer. In addition, the pixel layer may include an electro-wetting layer when the display apparatus 10 is the electro-wetting display.

The first substrate 100 is a color filter ("CF") substrate and the second substrate 200 is a thin film transistor array substrate. The first substrate 100 includes a display area PA in which an image is displayed, and a peripheral area SA surrounding the display area PA. Although not shown in FIG. 1, the second substrate 200 includes areas corresponding to the display area PA and the peripheral area SA of the first substrate 100. An upper surface of the adhesive part 400 is adhered to the peripheral area SA of the first substrate 100 and a lower surface of the adhesive part 400 is adhered to the area of the second substrate 200, which corresponds to the peripheral area SA of the first substrate 100.

The second substrate 200 further includes a gate bonding area GBA and a data bonding area DBA, which are defined on the second substrate 200 exposed to an exterior of the display apparatus 10. The gate bonding area GBA and the data bonding area DBA of the second substrate 200 are not overlapped by the first substrate 100 such that the gate bonding area GBA and the data bonding area DBA are exposed. The gate bonding area GBA includes a gate driver (not shown) and the data bonding area DBA includes a data driver (not shown). The gate driver and the data driver are electrically connected to the second substrate 200.

Figure 2:
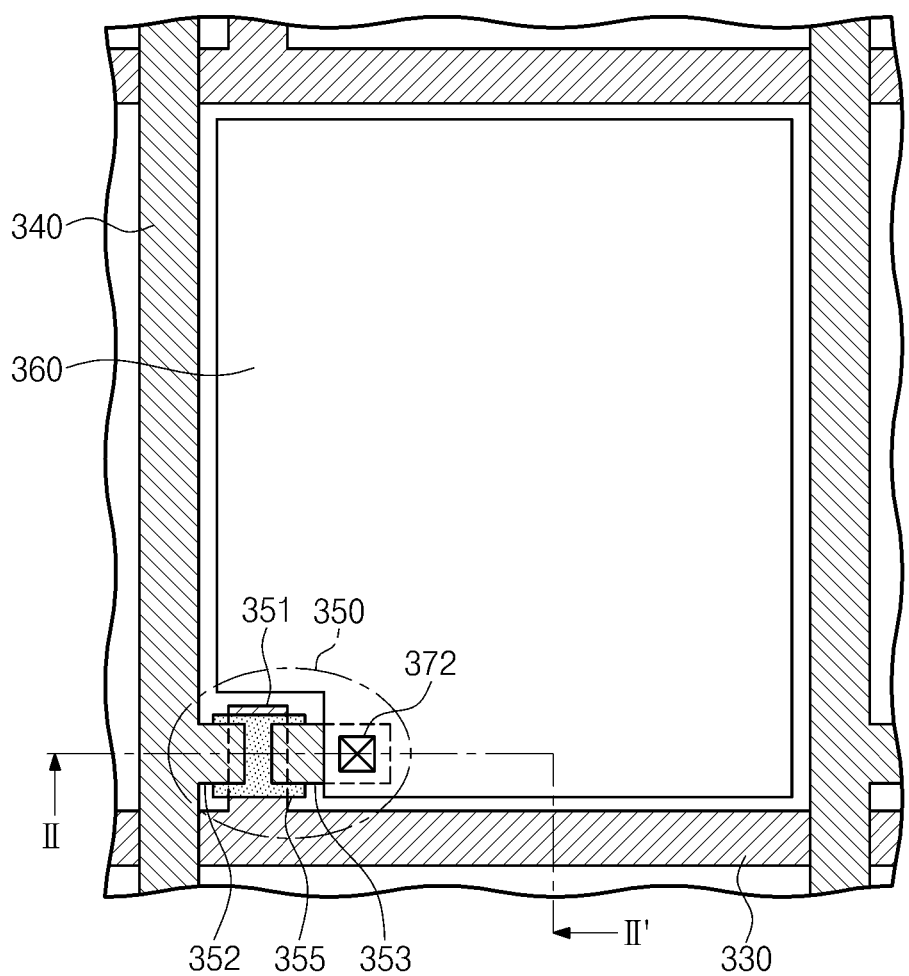
FIG. 2 is a plan view showing an exemplary embodiment of a portion of the display apparatus of FIG. 1.
Figure 3:
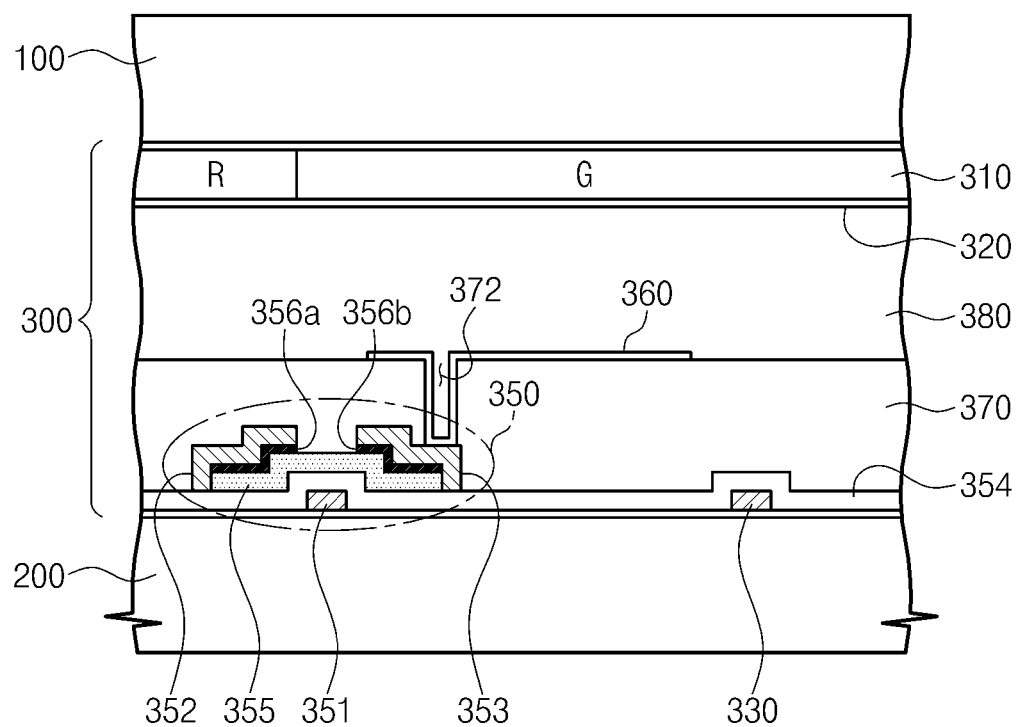
FIG. 3 is a cross-sectional view taken along line II-II' of FIG. 2.

FIG. 2 is a plan view showing an exemplary embodiment of a portion of the display apparatus of FIG. 1 and FIG. 3 is a cross-sectional view taken along line II-II' of FIG. 2.

Referring to FIGS. 2 and 3, a color filter 310 is disposed on the first substrate 100 to display colors of pixels, and a common electrode 320 is disposed on the color filter 310.

The second substrate 200 includes a gate line 330 and a data line 340 disposed thereon. The gate line 330 has a longitudinal axis which is extended in a row direction (horizontal in FIG. 2) and the data line 340 has a longitudinal axis which is extended in a column direction (vertical in FIG. 2). In one exemplary embodiment, the gate line 330 and the data line 340 may define a pixel area, but the invention is not limited thereto or thereby.

A thin film transistor 350 is disposed adjacent to a point at which the gate line 330 and the data line 340 intersect or cross each other in the plan view. The pixel area includes a pixel electrode 360. The pixel electrode 360 is physically and/or electrically connected to the thin film transistor 350, and forms an electric field in cooperation with the common electrode 320 of the first substrate 100 to drive a liquid crystal layer 380.

The thin film transistor 350 includes a gate electrode 351, a source electrode 352, a drain electrode 353, a gate insulating layer 354, an active layer 355, and an ohmic contact layers 356a and 356b. The gate electrode 351 is connected to the gate line 330, the source electrode 352 is connected to the data line 340 and the drain electrode 353 is connected to the pixel electrode 360. The gate insulating layer 354 insulates the gate electrode 351 from the source and drain electrodes 352 and 353. The active layer 355 is disposed on the gate insulating layer 354. The ohmic contact layer 356a is disposed between the source electrode 352 and the active layer 355, and the ohmic contact layer 356b is disposed between the drain electrode 353 and the active layer 355. Due to a scan signal applied to the gate electrode 351, a conductive channel is formed in a portion of the active layer 355 between the source electrode 352 and the drain electrode 353.

A protective layer 370 is disposed on the second substrate 200 and covers (e.g., overlaps) the thin film transistor 350. The protective layer 370 is provided with a contact hole 372 which extends completely therethrough to expose a portion of the drain electrode 353. The pixel electrode 360 is connected to the drain electrode 353 through the contact hole 372. The liquid crystal layer 380 is disposed between the pixel electrode 360 and the common electrode 320.

The scan signal is applied to the gate electrode 351 through the gate line 330. The conductive channel is formed by the portion of the active layer 355 between the source electrode 352 and the drain electrode 353 in response to the scan signal. A pixel signal is applied to the source electrode 352 through the data line 340. The pixel signal is provided to the pixel electrode 360 after sequentially passing through the source electrode 352, the ohmic contact layer 356a, the active layer 355, the ohmic contact layer 356b and the drain electrode 353. The common electrode 320 is applied with a common voltage. When the electric field is formed between the common electrode 320 and the pixel electrode 360, liquid crystal molecules of the liquid crystal layer 380 are realigned to control the amount of the light passing through the liquid crystal layer 380.

In the various exemplary embodiments of the invention, the color filter 310, the common electrode 320, the gate line 330, the data line 340, the thin film transistor 350, the pixel electrode 360, the protective layer 370 and the liquid crystal layer 380 may be collectively referred to as the pixel layer 300.

Figure 4:
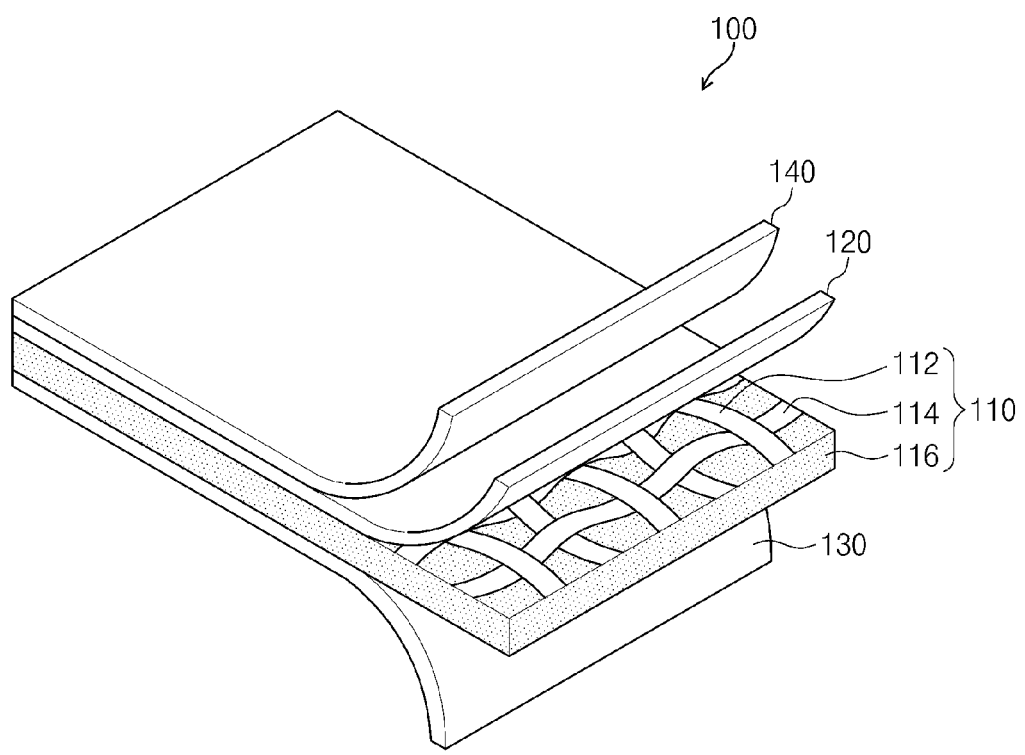
FIG. 4 is a perspective view showing an exemplary embodiment of a first substrate of FIG. 1.
Figure 5:
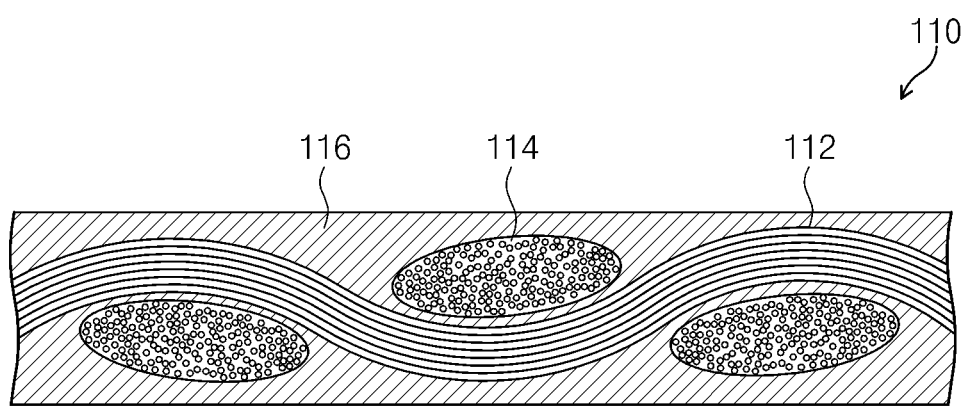
FIG. 5 is a cross-sectional view of an exemplary embodiment of a preliminary substrate of FIG. 4.

FIG. 4 is a perspective view showing an exemplary embodiment of a first substrate of FIG. 1 and FIG. 5 is a cross-sectional view of an exemplary embodiment of a preliminary substrate of FIG. 4. In the exemplary embodiment, the first substrate 100 and the second substrate 200 have the same structure and function, and thus only the first substrate 100 will be described in detail.

Referring to FIGS. 4 and 5, the first substrate 100 includes a preliminary substrate 110, a first coating layer 120, a second coating layer 130 and a blocking layer 140. The preliminary substrate 110 may be a flexible substrate, e.g., a fiber-reinforced plastic ("FRP") substrate. The preliminary substrate 110 includes fiber bundles 112 and 114, and a base material 116 such as a resin. The fiber bundles 112 each have a longitudinal axis which extends in a first direction. The fiber bundles 114 each have a longitudinal axis which extends in a second direction different from the first direction. The fiber bundles 112 and 114 are woven in the first direction, and the second direction crossing the first direction. That is, one of the fiber bundles 112 and 114 alternates being above or below the other of the fiber bundles 114 along the first and second directions. The fiber bundles 112 and 114 may include glass fibers. The resin 116 is impregnated between the woven fiber bundles 112 and 114. The resin 116 may include a heat-curable resin or a thermoplastic resin.

The first coating layer 120 is coupled to an upper surface of the preliminary substrate 110 and the second coating layer 130 is coupled to a lower surface of the preliminary substrate 110. The first and second coating layers 120 and 130 planarize rough portions caused by the fiber bundles 112 and 114. The first and second coating layers 120 and 130 may include a heat-curable polymer organic material.

The blocking layer 140 is coupled to an upper surface of the first coating layer 120. The blocking layer 140 may reduce or effectively prevent foreign substances from being infiltrated into the pixel layer 300 disposed on the first substrate 100. The blocking layer 140 may have a single-layer structure of silicon nitride (SiNx) or silicon oxide ($SiO_2$), or a double-layer structure of a transparent acrylate polymer and one of silicon nitride or silicon oxide.

Figure 6:
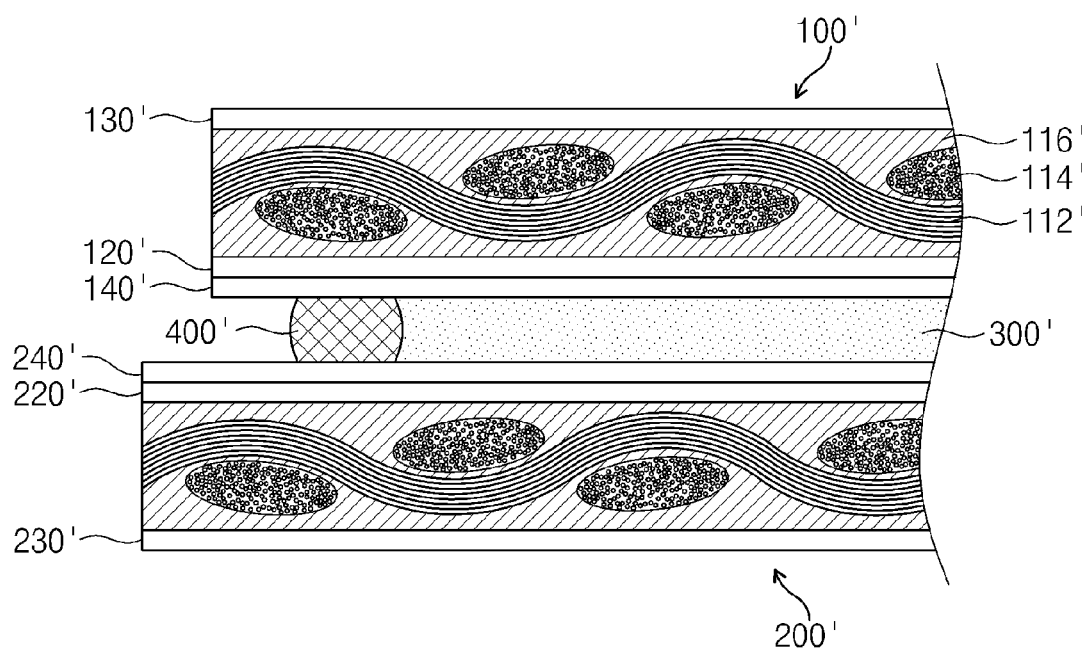
FIG. 6 is a cross-sectional view showing a conventional liquid crystal display.

FIG. 6 is a cross-sectional view showing a conventional liquid crystal display.

Referring to FIG. 6, an upper substrate 100' and a lower substrate 200' may be a glass fiber-reinforced plastic substrate.

The upper substrate 100' and the lower substrate 200' face each other. A pixel layer 300' is disposed between a blocking layer 140' of the upper substrate 100' and a blocking layer 240' of the lower substrate 200'. The upper substrate 100' and the lower substrate 200' are coupled to each other by an adhesive part 400', and the adhesive part 400' seals the pixel layer 300' between the blocking layers 140' and 240'. An upper surface of the adhesive part 400' is adhered to directly the blocking layer 140' of the upper substrate 100' and a lower surface of the adhesive part 400' is adhered directly to the blocking layer 240' of the lower substrate 200'.

Reference numerals 112' and 114' indicate glass fiber bundles, a reference numeral 116' indicates a base material such as resin impregnated between the glass fiber bundles 112' and 114', and a reference numeral 120' indicates a coating layer.

Figure 7:
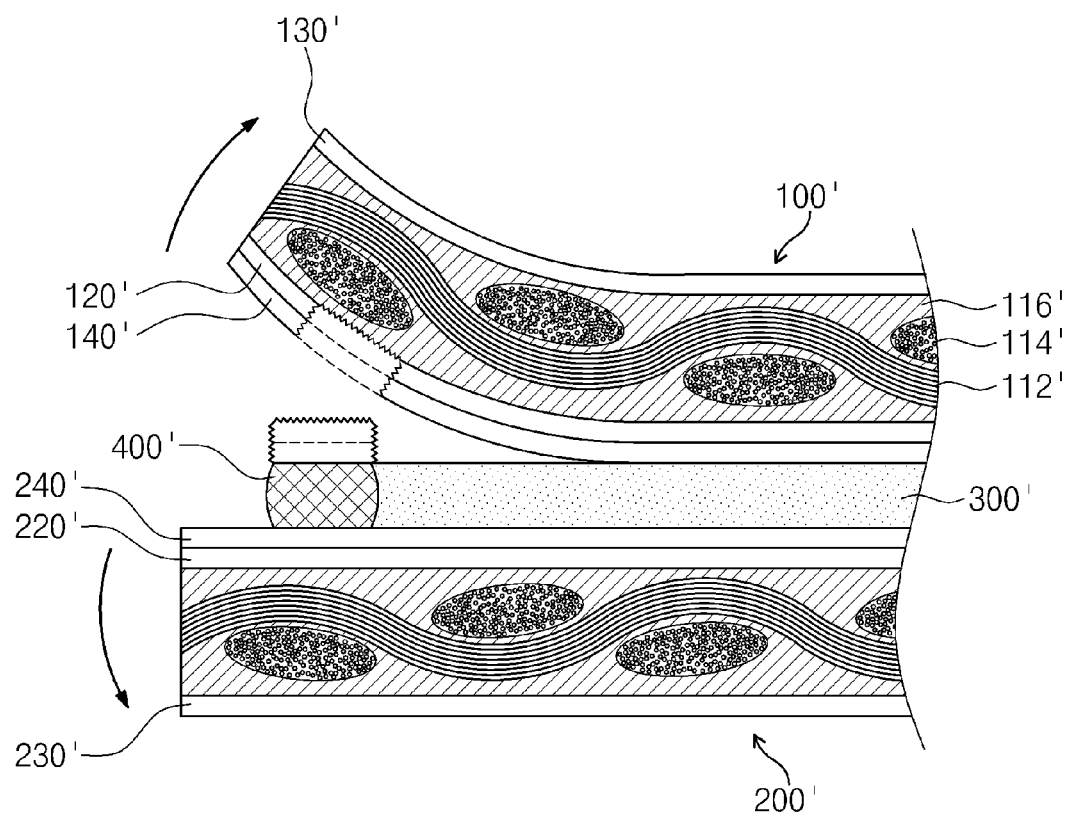
FIG. 7 is a cross-sectional view showing substrates separated from each other of FIG. 6.

FIG. 7 is a cross-sectional view showing substrates separated from each other of FIG. 6.

Referring to FIG. 7, when a liquid crystal display is bent by external force, the upper substrate 100' and the lower substrate 200' are separated from each other. This is caused by an adhesive force between the coating layer 120' and the resin 116', which is relatively weaker than an adhesive force between the adhesive part 400' and the blocking layers 140' and 240'. That is, a fracture occurs at the interface between the coating layer 120' and the resin 116', thereby causing the separation of the upper substrate 100' and the lower substrate 200' from each other.

FIGS. 8A to 8D are views showing an exemplary embodiment of a method of manufacturing a display apparatus according to the invention.

Figure 8A:
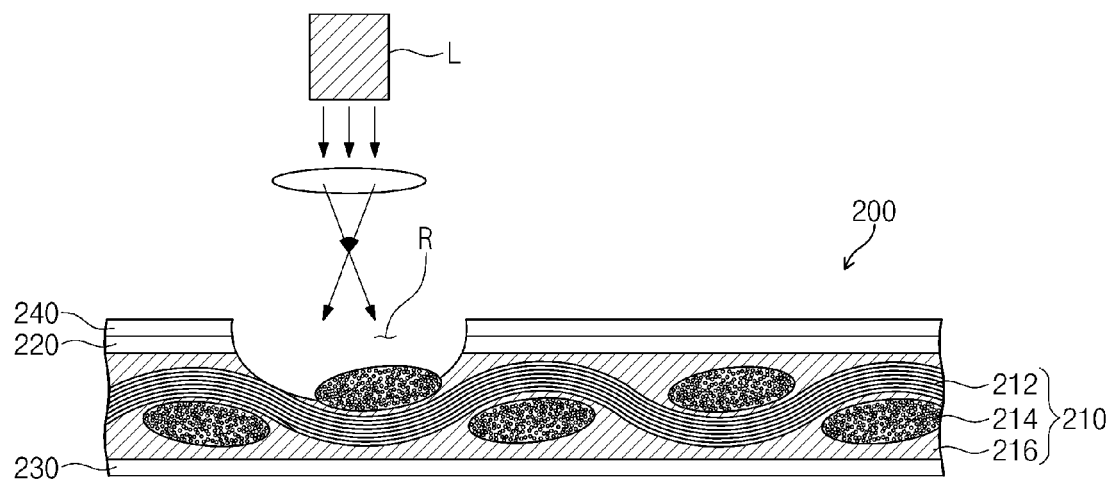
FIGS. 8A to 8D are views showing an exemplary embodiment of a method of manufacturing a display apparatus according to the invention.

Referring to FIG. 8A, a preliminary substrate 210 may be the flexible fiber-reinforced plastic substrate. The preliminary substrate 210 includes fiber bundles 212 and 214 between which a base material such as resin 216 is impregnated. The fiber bundles 212 and 214 may be glass fibers. Coating layers 220 and 230 are respectively formed on upper and lower surfaces of the preliminary substrate 210, and a blocking layer 240 is formed on one of the coating layers 220 and 230.

The second substrate 200 includes an adhesive area and a recess R is formed in the adhesive area. In various exemplary embodiments, the recess R may otherwise be referred to as an exposure area. Portions of the blocking layer 240, the coating layer 220, and the resin 216, which are in the adhesive area, are removed such as by a beam from a laser L, to thereby form the recess R. The beam from the laser L has a temperature higher than a melting point of the blocking layer 240, the coating layer 220 and the resin 216, and lower than a melting point of the fiber bundles 212 and 214. Thus, when forming the recess R, the fiber bundles 212 and 214 are not removed, and thus the fiber bundles 212 and 214 are exposed to the exterior of the second substrate 200 through the recess R. The laser L may irradiate the light having an infrared ray wavelength range onto the portions of the blocking layer 240, the coating layer 220 and the resin 216. For instance, the laser L may be a carbon dioxide ($CO_2$) laser.

Figure 8B:
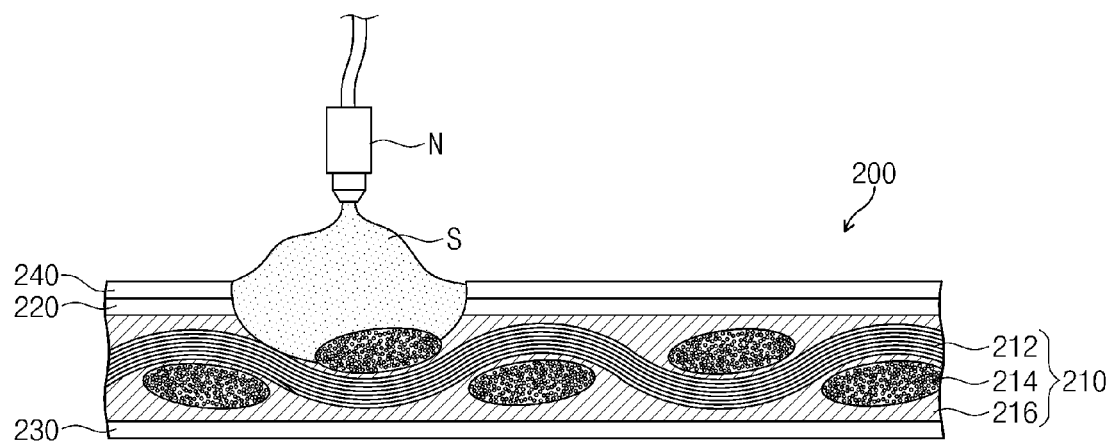

As shown in FIG. 8B, a sealant S is supplied into the recess R such as by using a nozzle N, after forming the recess R in the second substrate 200. The amount of the sealant S supplied into the recess R is larger than a volume of the recess R. In addition, the sealant S may be sufficiently provided such that a cell gap between two substrates is maintained.

Figure 8C:
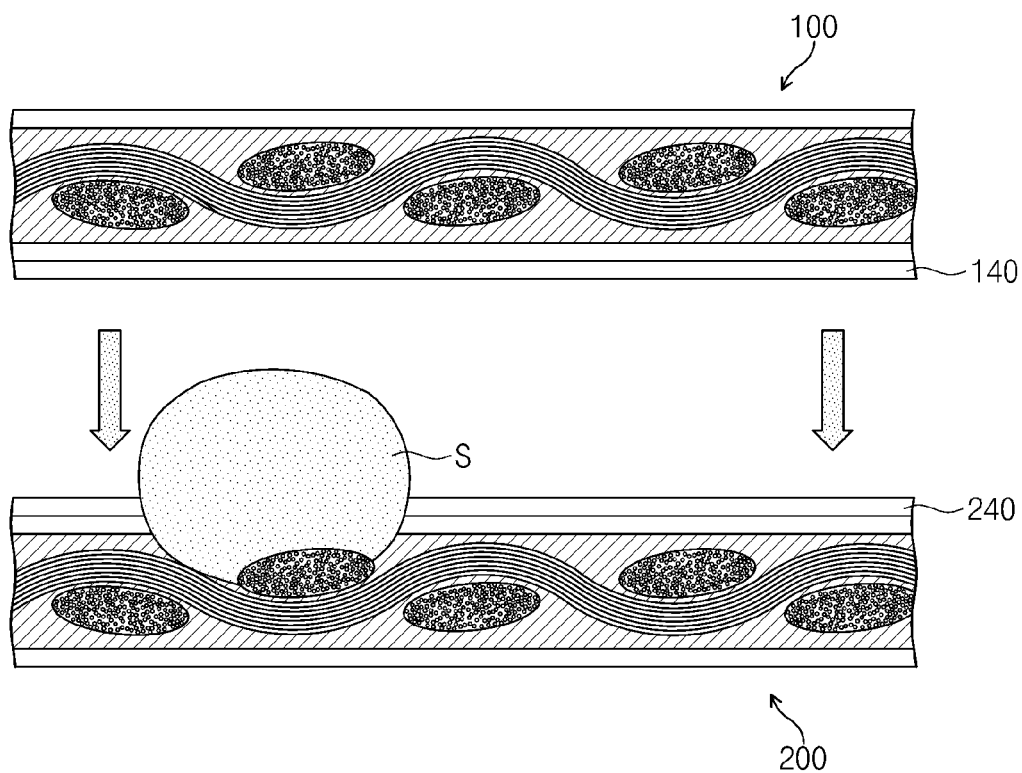

Referring to FIG. 8C, when the supply of the sealant S is completed, the first substrate 100 is aligned on the second substrate 200. The recess as shown in FIG. 8A is not formed in the first substrate 100, but the invention is not limited thereto or thereby.

Figure 8D:
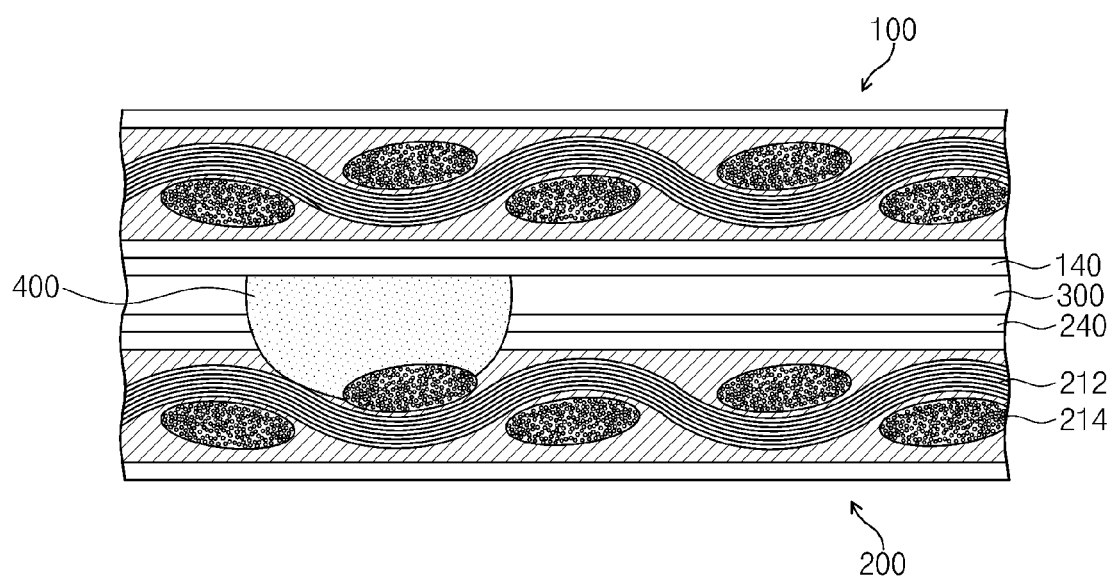

Then, referring to FIG. 8D, after aligning the first and second substrates 100 and 200, the first substrate 100 is pressed toward the second substrate 200 to couple the first substrate 100 with the second substrate 200. The sealant S is cured to form the adhesive part 400. In this case, the sealant S is adhered directly to the blocking layer 140 of the first substrate 100 and directly to the exposed fiber bundles 212 and 214 of the second substrate 200. Since the surface of the exposed fiber bundles 212 and 214 has a plurality of concavo-convex portions, an effective area, to which the sealant S is adhered, is increased, thereby improving the adhesive force between the adhesive part 400 and the second substrate 200. In addition, the pixel layer 300 disposed between the first and second substrates 100 and 200 is formed on the second substrate 200 before coupling the first substrate 100 with the second substrate 200, but it should not be limited thereto or thereby.

In the exemplary embodiment as described above, the recess R through which the fiber bundles 212 and 214 are exposed is formed in the second substrate 200, but it should not be limited thereto or thereby. That is, the recess R may be formed in the first substrate 100 as shown in FIGS. 9 and 10.

Figure 9:
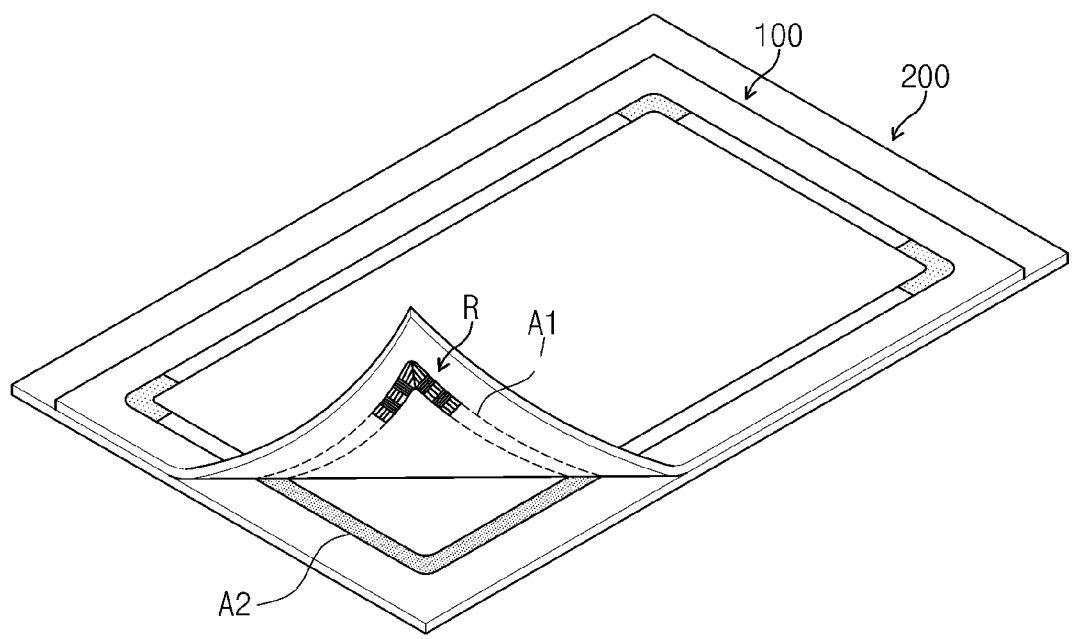
FIGS. 9 to 11 are perspective views showing alternative exemplary embodiments of display apparatuses according to the invention.
Figure 10:
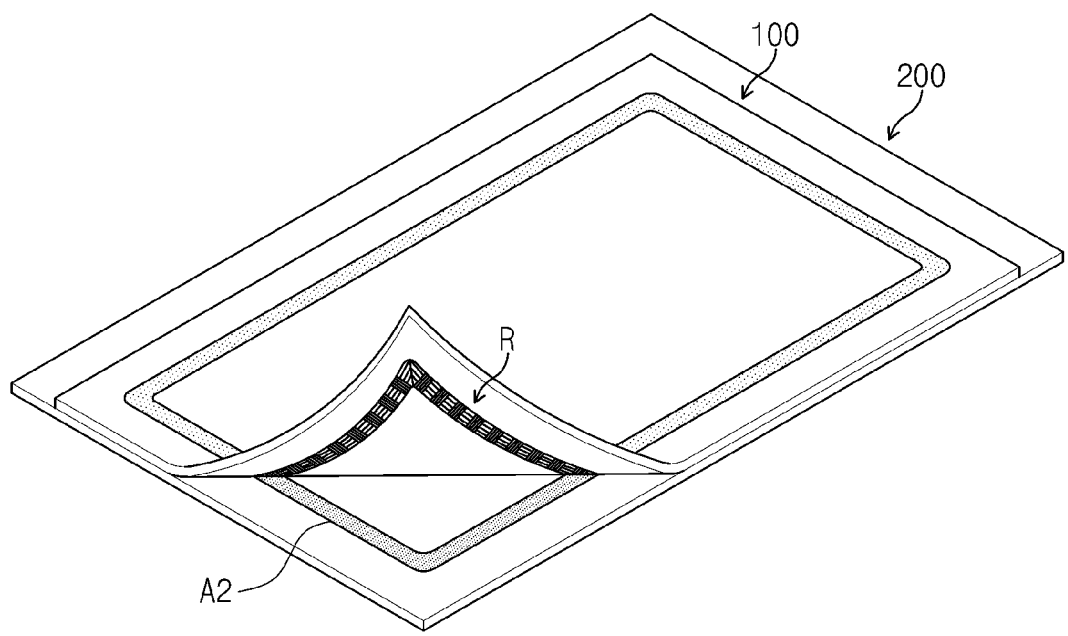
Figure 11:
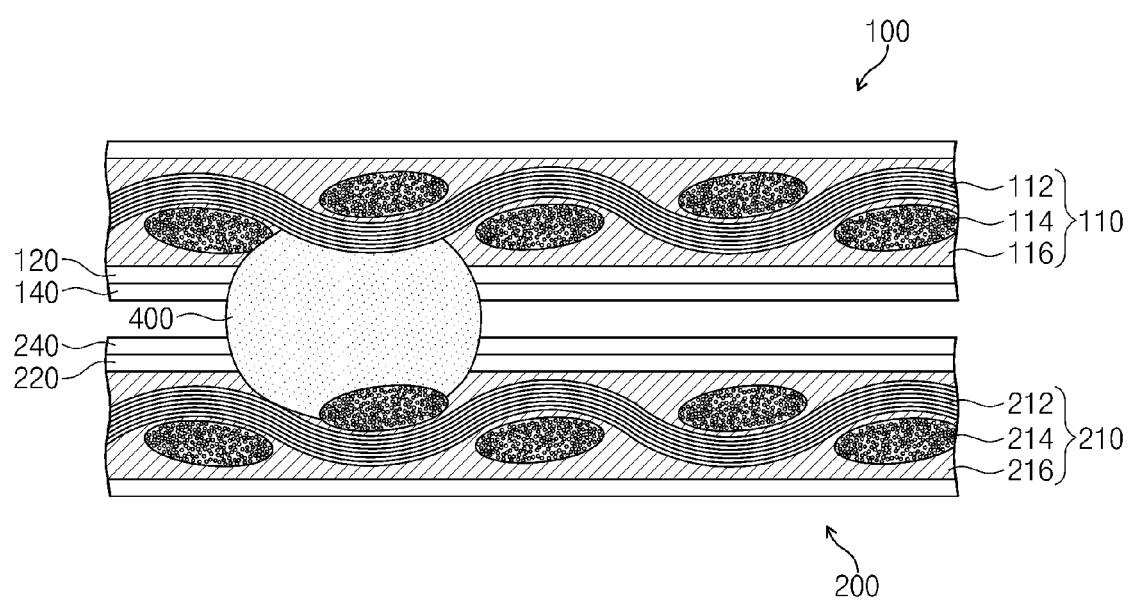

FIGS. 9 to 11 are perspective views showing alternative exemplary embodiments of display apparatuses according to the invention.

Referring to FIGS. 9 and 10, a first adhesive area A1 is provided on the lower surface of the first substrate 100 and a second adhesive area A2 is provided on the upper surface of the second substrate 200. Each of the first and second adhesive areas A1 and A2 may have a rectangular frame shape to surround the display area PA. The adhesive part (not shown) is adhered to the first and second adhesive areas A1 and A2. As shown in FIG. 9, the recess R may be only at each of four corners of the first adhesive area A1. Alternatively, the recess R may be in a whole of the first adhesive area A1 as shown in FIG. 10. Alternatively, the recess R may be in a whole of any combination of long and short sides of the first adhesive area A1. Further, the recess R may be in both of the first substrate 100 and the second substrate 200 as illustrated in FIG. 11.

As described above, since the adhesive part is adhered to the exposed fiber bundles of the substrate, the adhesive force of the adhesive part may be improved with respect to the substrate. As a result, separation of the substrates from each other may be reduced or effectively prevented.

Figure 12A:
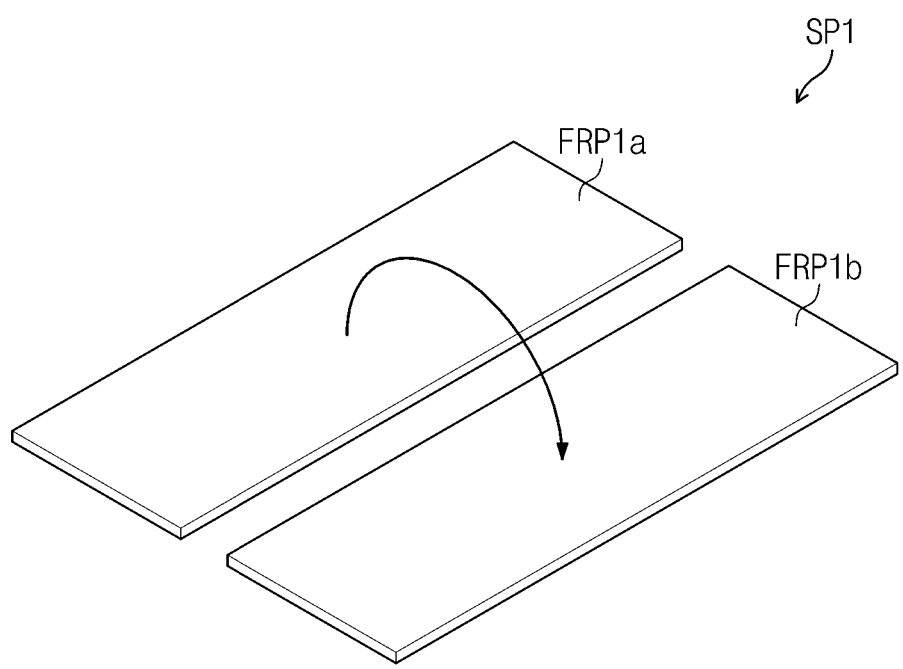
FIGS. 12A to 12C are views showing substrate test samples.
Figure 12B:
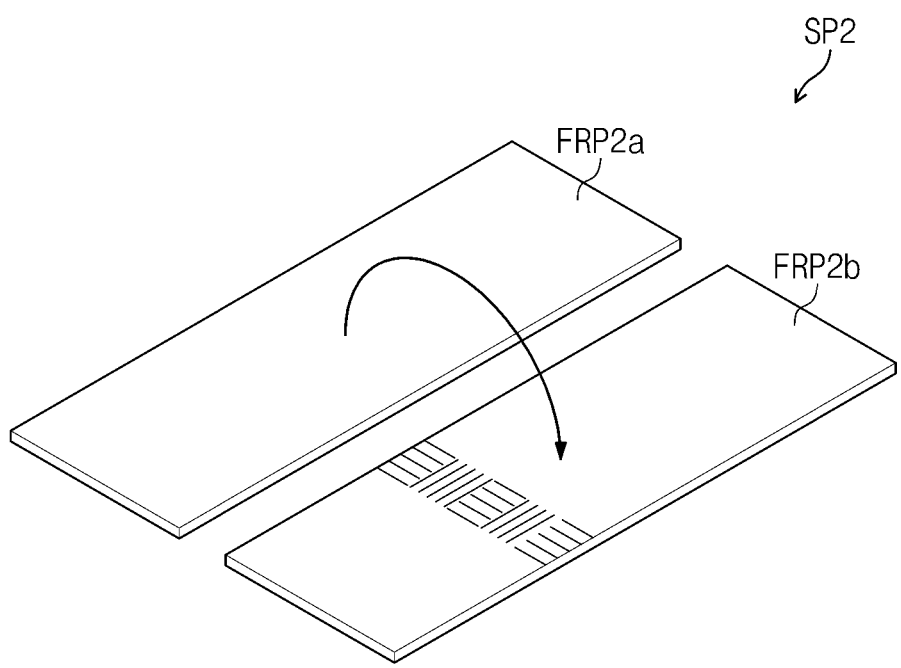
Figure 12C:
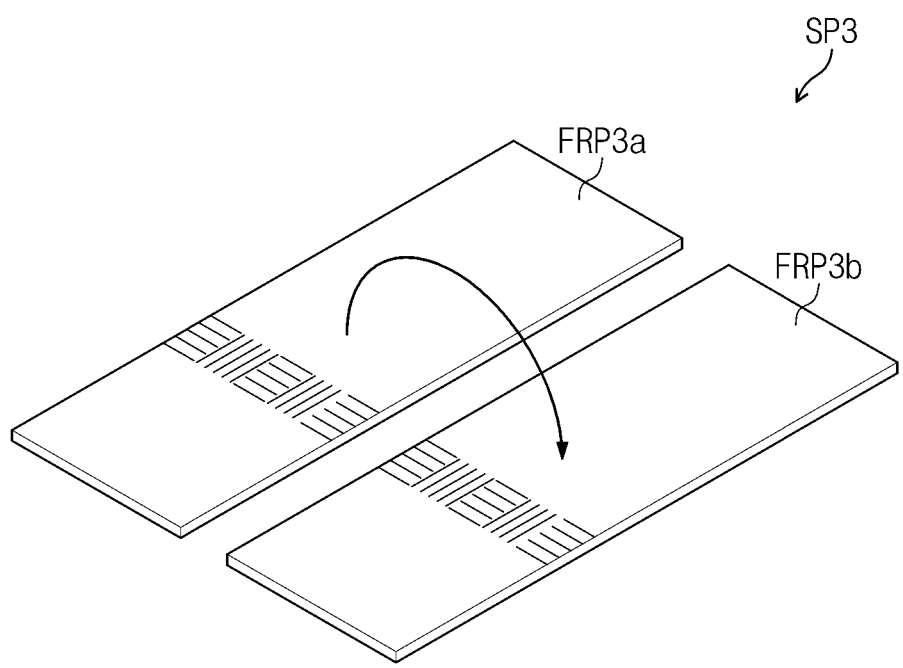
Figure 13:
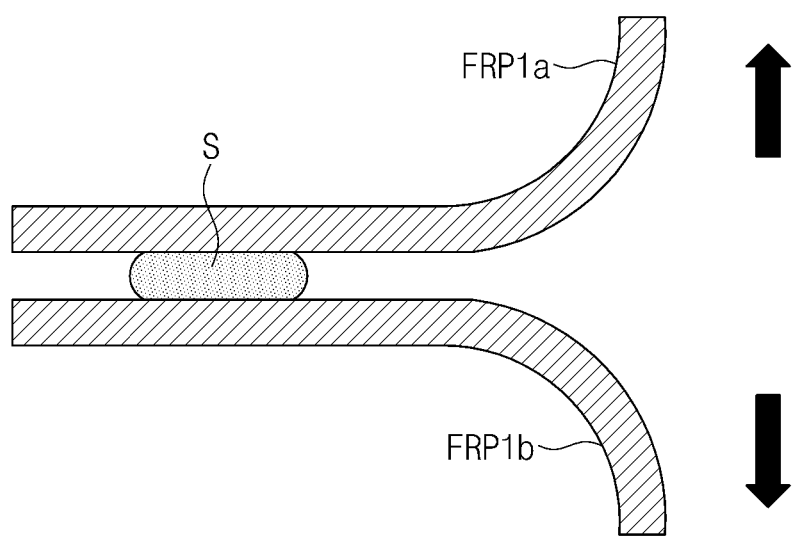
FIG. 13 is a view showing a test process for the substrate test samples.
Figure 14:
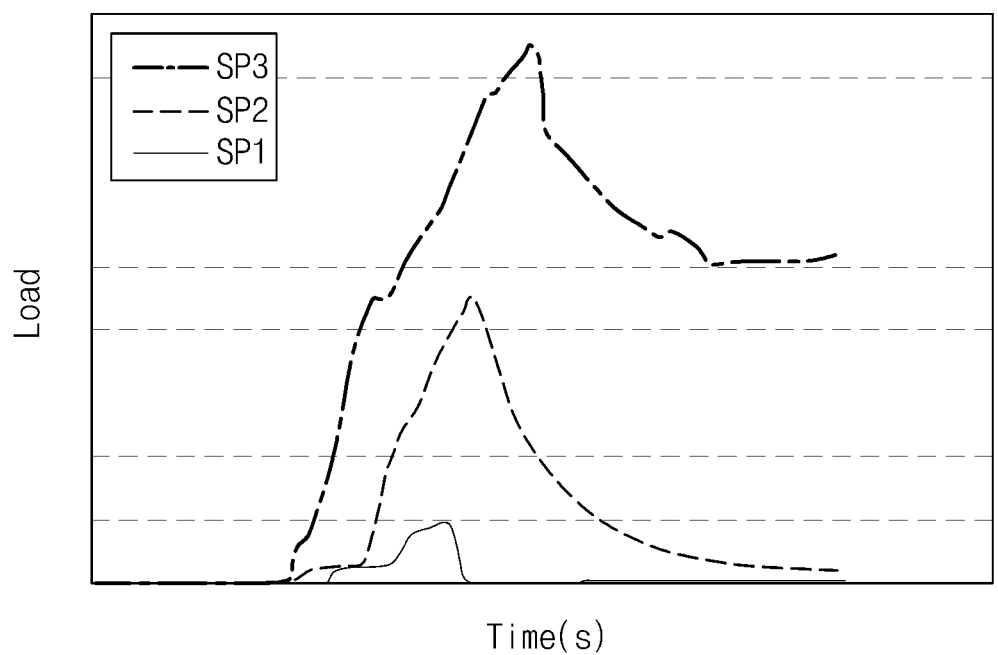
FIG. 14 is a graph showing a test result of the substrate test samples.

FIGS. 12A to 12C are views showing substrate test samples, FIG. 13 is a view showing a test process for the substrate test samples, and FIG. 14 is a graph showing a test result of the substrate test samples.

Referring to FIGS. 12A to 12C, 13 and 14, three kinds of substrate test samples SP1, SP2 and SP3 were prepared. The first test sample SP1 includes FRP substrates FRP1a and FRP1b each in which fiber bundles are not exposed as shown in FIG. 12A. The second test sample SP2 includes an FRP substrate FRP2a in which fiber bundles are not exposed and an FRP substrate FRP2b in which the fiber bundles are exposed as shown in FIG. 12B. The third test sample SP3 includes FRP substrates FRP3a and FRP3b each in which the fiber bundles are exposed.

As shown in FIG. 13, the FRP substrates FRP1a and FRP1b of the first test sample SP1 were coupled to each other by the sealant S. The FRP substrates FRP1a and FRP1b were separated from each other by an operating load (indicated by the arrows) applied thereto, and the operating load was measured until the FRP substrates FRP1a and FRP1b were separated from each other. In addition, the second and third test samples SP2 and SP3 were tested in the same way as the first test sample SP1.

FIG. 14 is a graph of the load with respect to time in seconds (s) for each testing of the test samples SP1, SP2 and SP3. In FIG. 14, a peak value of each graph line indicates the operating load at the moment at which the FRP substrates are separated from each other. As shown in FIG. 14, the first test sample SP1 has the smallest adhesive force among the first, second, and third test samples SP1, SP2, and SP3. That is, it took the smallest load to separate the FRP substrates. The third test sample SP3 has the largest adhesive force among the first, second, and third test samples SP1, SP2 and SP3. The second test sample SP2 has an adhesive force between the first test sample SP1 and the third test sample SP3.

Thus, when the fiber bundles of the FRP substrates are exposed and the sealant is applied to the exposed fiber bundles, the adhesive force is improved. Therefore, separation of the FRP substrates from each other may be reduced or effectively prevented.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a first substrate including an adhesive area, fiber bundles, and a base material which is impregnated between the fiber bundles;
   a second substrate including an adhesive area, fiber bundles, and a base material which is impregnated between the fiber bundles;
   a pixel layer between the first substrate and the second substrate, and including a display area; and
   an adhesive part between the first substrate and the second substrate and in each of the adhesive areas of the first substrate and the second substrate, wherein the adhesive part seals the pixel layer between the first substrate and the second substrate,
   wherein
   the adhesive area of at least one of the first and second substrates including the fiber bundles includes an exposure area in which an exterior of the respective fiber bundles is exposed and an interior of the respective bundles is not exposed, and
   the adhesive part contacts the exterior of the respective fiber bundles exposed at the exposure area in which the interior of the respective bundles is not exposed.

2. The display apparatus of claim 1, wherein
   the adhesive area including the exposure area has a rectangular shape and surrounds the display area of the pixel layer in a plan view, and
   the exposure area is at corners of the adhesive area.

3. The display apparatus of claim 1, wherein
the adhesive area including the exposure area has a rectangular shape and surrounds the display area of the pixel layer in a plan view, and
the exposure area is in a whole of the adhesive area.

4. The display apparatus of claim 1, wherein only one of the first substrate or the second substrate includes the exposure area.

5. The display apparatus of claim 1, wherein both the first substrate and the second substrate includes the exposure area.

6. The display apparatus of claim 1, wherein the fiber bundles comprise glass fibers.

7. The display apparatus of claim 1, wherein the fiber bundles are woven in a first direction, and a second direction crossing the first direction.

8. The display apparatus of claim 1, further comprising a coating layer on an upper surface and a lower surface of the first substrate and on an upper surface and a lower surface of the second substrate,
wherein
the coating layer planarizes an upper surface and a lower surface of the fiber bundles of the first substrate and the second substrate, respectively, and
the exposure area excludes the coating layer.

9. The display apparatus of claim 1, wherein the base material comprises a heat-curable resin or a thermoplastic resin.

10. The display apparatus of claim 1, wherein the pixel layer comprises a liquid crystal layer, an organic light emitting layer, an electrophoretic layer or an electro-wetting layer.

11. The display apparatus of claim 1, wherein the exposure area is a laser-irradiated area at which the base material is removed to expose the exterior of the respective fiber bundles and to not expose the interior of the respective fiber bundles.

12. A display apparatus comprising:
a first substrate comprising a reinforcing layer including fiber bundles;
a second substrate which faces the first substrate and comprises a reinforcing layer including fiber bundles;
a pixel layer between the first substrate and the second substrate; and
an adhesive part between the first substrate and the second substrate, wherein the adhesive part adheres the first substrate to the second substrate and seals the pixel layer between the first substrate and the second substrate,
wherein
at least one of the first and second substrates comprising the fiber bundles of the
comprises a recess as an exposure area in which an exterior of the respective fiber bundles is exposed and an interior of the respective bundles is not exposed, and
the adhesive part contacts the exterior of the respective fiber bundles exposed at the exposure area in which the interior of the respective bundles is not exposed.

13. The display apparatus of claim 12, wherein
each of the first substrate and the second substrate comprises a fiber-reinforced plastic substrate,
the fiber-reinforced plastic substrate comprises fiber bundles which are distributed therein, and
the fiber bundles are exposed through the recess.

14. The display apparatus of claim 13,
wherein each of the first substrate and the second substrate further comprises:
a coating layer on the fiber-reinforced plastic substrate, wherein the coating layer planarizes a surface of the fiber-reinforced plastic substrate; and
a blocking layer on the coating layer, wherein the blocking layer prevents foreign substances from infiltrating into the pixel layer, and
wherein the recess excludes the coating layer and the blocking layer.

15. The display apparatus of claim 13, wherein the fiber bundles comprise a fiber glass.

\* \* \* \* \*